Patented May 25, 1948

2,442,040

UNITED STATES PATENT OFFICE 2,442,040

MANUFACTURE OF ACRYLONITRILE FROM ACETYLENE AND HCN

Reginald Thomas Foster, Birkenhead, England, assignor to Imperial Chemical Industries Limited, a corporation of Great Britain No Drawing. Application May 29, 1946, Serial No. 673,172. In Great Britain June 15, 1945

6 Claims. (Cl. 260—464)

This invention relates to improvements in the manufacture of unsaturated nitriles, and more particularly to the manufacture of acrylonitrile.

It has already been proposed to prepare acrylonitrile by reacting acetylene with hydrocyanic acid in the presence of a catalyst containing a cuprous compound. Thus acetylene and hydrocyanic acid could be passed into a stirred aqueous solution containing cuprous chloride, bromide, or iodide, and ammonium bromide or chloride or the corresponding sodium or potassium salt. The reaction could be carried out at ordinary or elevated temperatures, and the acrylonitrile could be recovered by solvent extraction or azeotropic distillation. It is found that goods yields of acrylonitrile are normally obtained by this process when the feed rate of the hydrogen cyanide is kept below a certain level, but an increase in the feed rate above this level usually results in a corresponding decrease in conversion of hydrogen cyanide and in yield with formation of unwanted by-products.

According to the present invention, improved yields of acrylonitrile are obtained by a process which comprises reacting acetylene with hydrogen cyanide in the presence of an aqueous solution containing a cuprous salt and mercury, for example, in the form of a mercury compound or salt.

The presence of the mercury salt has the effect of increasing the rate at which acrylonitrile can be produced per unit of catalyst solution. The acrylonitrile is apparently formed at the expense of unwanted by-products, and almost theoretical yields on the basis of hydrogen cyanide consumption are thus obtained.

The reaction is usually carried out in an aqueous acid medium and, in the case of a catalyst solution containing, for instance, cuprous ammonium chloride together with free hydrochloric acid, a mercury compound such as mercuric chloride is found to be particularly suitable. It is to be understood, however, that the invention is not restricted to any particular form of mercury, and that the choice of such form will depend upon the other components to be used and on the reaction conditions in general.

In one form of the invention the catalytic reaction medium may be an aqueous solution of cuprous ammonium chloride and cuprous chloride which is practically saturated at the reaction temperature of 80° C. and in which is dissolved a small proportion of a soluble mercuric salt; suitably the solution contains between 1% and 5% mercuric chloride. Preferably, 5% to 10% of copper powder is also added to the aqueous solution to ensure that all the copper salts are present in the cuprous state. The catalyst solution should be acid in order to prevent the formation of the explosive copper acetylide and it is therefore desirable to maintain the solution at a pH between 1 and 2. Strong aqueous hydrochloric acid may be used for this purpose, and in general it is found that an addition of 3% to 5% of acid is sufficient to produce the required effect.

The solution is warmed to, say, between 80° C. and 95° C., stirred by means of a paddle stirrer or equivalent means, and hydrogen cyanide vapour and an excess of acetylene are then passed into the solution at such a rate that the greater part of the hydrogen cyanide reacts with the acetylene. The gaseous reactants may be passed separately, in the requisite proportions, into the catalyst solution, or they may, if desired, be mixed before entering the reaction vessel. In the absence of mercury salts, a hydrogen cyanide feed rate of over 0.30 moles/hour per 500 cc. of catalyst is found to result in lower pass conversions and lower yields and in greater quantities of by-product impurities. When, however, mercury salts are present, according to this invention, and using the same amount of catalyst, the hydrogen cyanide feed rate may be increased to 0.50 moles/hour or even greater without any noticeable loss in yield. An excess of acetylene is desirable, since it enables a substantially complete conversion of the more expensive hydrogen cyanide to be effected. However, the amount of excess acetylene is not critical, and between 3 and 6 moles of acetylene per mole of hydrogen cyanide or even more may be used. The acetylene and hydrogen cyanide mixture may be diluted with an inert gas such as nitrogen so that the increased volume of gas then delivered to the solution may provide sufficient agitation for a mechanical stirring device to be unnecessary. Reaction occurs with the evolution of heat, and to maintain steady reaction conditions it may be desirable to cool the reaction medium. As reaction proceeds the acrylonitrile formed will vaporise as an azeotrope with water, and the mixed steam and acrylonitrile vapour can then be condensed, and purified by redistillation. The distillate separates into an aqueous layer and a layer of acrylonitrile, and the latter can be drawn off and dried, for example over calcium chloride.

As the reaction proceeds it will be necessary periodically to add further quantities of water to the reaction medium to replace that removed as an azeotrope with the acrylonitrile. When using an apparatus similar to that described in the following examples, however, the water carried along with the acrylonitrile is automatically returned to the reaction vessel by means of the separator and in consequence there is very little actual loss of water and only infrequent additions will be required. It is also desirable to adjust the pH of the reaction medium from time to time by the addition of hydrochloric acid.

The following examples illustrate but do not limit the invention, all parts being by weight:

Example 1

A catalyst was prepared containing 376 parts of cuprous chloride, 125 parts of ammonium chloride, 30 parts of copper powder, 10 parts of mercuric chloride (representing 1.25% of total weight of catalyst solution), and 300 parts of water. The water was added to the mixed solids and the catalyst mixture was then placed in a reaction vessel fitted with a gas inlet tube, a stirrer fitted in a mercury seal, and a gas exit tube, the latter leading to a water-cooled continuous separator. Two condensers in series were connected to the top of the separator, the first being cooled to about $-10°$ C. and the second to temperatures of the order of $-70°$ C. to $-60°$ C. The side tube from the separator led to a closed receiver kept at room temperature. The reaction vessel was surrounded by a steam-heated water jacket.

The catalyst mixture was heated to 90° C., nitrogen being passed through during the heating to provide agitation and to prevent oxidation. Sufficient concentrated hydrochloric acid was then added to bring the pH of the solution to 1.5. A gaseous mixture of acetylene and hydrogen cyanide in the proportion of 4 moles of the former to 1 mole of the latter was then passed into the heated catalyst at a feed rate of 0.41 mole of hydrogen cyanide an hour per 500 cc. of catalyst, the catalyst solution being stirred continuously throughout the reaction. The reaction mixture was maintained at a temperature of about 80–95° C.

After a 4¾ hours' run the gas feed was shut off and nitrogen was passed through the catalyst while the latter was cooled to room temperature. After cooling, the catalyst was kept under nitrogen until required for further use.

The product, together with steam, gaseous by-products and unchanged hydrogen cyanide, passed into the separator, and from thence into the condensers. The condensate running back into the separator formed two layers the lower aqueous layer returning to the reaction vessel while the acrylonitrile passed over to the receiver.

The crude acrylonitrile which had collected in the receiver was dried and purified by distillation. The percentage conversion of hydrogen cyanide was found to be 89.5%.

Example 2

A catalyst was prepared as in Example 1, but containing an amount of mercuric chloride corresponding to 2.5% of the total weight of catalyst solution, and a mixture of acetylene and hydrogen cyanide in the proportion of 6:1 was passed into the heated solution at a hydrogen cyanide feed rate of 0.48 mole/hour. The yield of acrylonitrile was 98.2% of the theoretical based on hydrogen cyanide and the percentage conversion of hydrogen cyanide was 85.2%, 13.2% being recovered unchanged.

Example 3

The catalyst was prepared as in Example 1, but with the addition of mercuric chloride corresponding to 5% of the total catalyst solution. The acetylene-hydrogen cyanide ratio was 6:1 and the hydrogen cyanide feed rate was again 0.48 mole/hour. The yield on hydrogen cyanide was 95.9%, the percentage conversion 88.8%, and unchanged hydrogen cyanide 7.4%.

Comparison

An experiment was carried out using the same catalyst as in the examples given above, but in the absence of mercury compounds. The acetylene-hydrogen cyanide ratio was 6:1 and the hydrogen cyanide feed rate was 0.46 mole/hour. In this case the yield on hydrogen cyanide was 85.3%, the percentage conversion 77.1%, and the unchanged hydrogen cyanide 9.5%.

I claim:
1. In the process of producing acrylonitrile by reacting acetylene and hydrocyanic acid in the presence of an aqueous cuprous halide catalyst solution, the improvement which comprises incorporating in said solution a water-soluble salt of mercury, and feeding said reactants into said solution at such a rate that the hydrogen cyanide feed rate exceeds 0.3 mole per hour per 500 cc. of catalyst solution.
2. In the process of claim 1 in which the mercury salt is mercuric chloride.
3. In the process of producing acrylonitrile by reacting acetylene and hydrocyanic acid in the presence of an aqueous cuprous halide catalyst solution, the improvement which comprises incorporating in said solution between 1% and 5% by weight of said solution of mercuric chloride, and feeding said reactants into said solution at such a rate that the hydrogen cyanide feed rate exceeds 0.3 mole per hour per 500 cc. of catalyst solution.
4. In the process of producing acrylonitrile by reacting acetylene and hydrocyanic acid in the presence of an aqueous cuprous halide catalyst solution, the improvement which comprises incorporating in said solution a water-soluble salt of mercury, and feeding said reactants into said solution at such a rate that the hydrogen cyanide feed rate is between 0.3 and 0.5 mole per hour per 500 cc. of catalyst solution.
5. In the process of claim 4 in which the mercury salt is mercuric chloride.
6. In the process of producing acrylonitrile by reacting acetylene and hydrocyanic acid in the presence of an aqueous cuprous halide catalyst solution, the improvement which comprises incorporating in said solution between 1% and 5% by weight of said solution of mercuric chloride, and feeding said reactants into said solution at such a rate that the hydrogen cyanide feed rate is between 0.3 and 0.5 mole per hour per 500 cc. of catalyst solution.

REGINALD THOMAS FOSTER.

REFERENCES CITED

The following references are of record in the file of this patent:

UNITED STATES PATENTS

| Number | Name | Date |
|---|---|---|
| 1,541,174 | Ostromislensky | June 9, 1925 |
| 1,812,542 | Nieuwland | June 30, 1931 |
| 2,338,459 | Schaeffer | Jan. 4, 1944 |
| 2,385,327 | Bradley et al. | Sept. 25, 1945 |
| 2,385,551 | Spence et al. | Sept. 25, 1945 |
| 2,385,469 | Salley | Sept. 25, 1945 |
| 2,385,470 | Salley et al. | Sept. 25, 1945 |
| 2,409,124 | Heuser | Oct. 8, 1946 |
| 2,414,762 | Owen et al. | Jan. 21, 1947 |

FOREIGN PATENTS

| Number | Country | Date |
|---|---|---|
| 217,478 | Switzerland | Feb. 2, 1942 |